United States Patent [19]

Rudeen

[11] Patent Number: 5,216,550
[45] Date of Patent: Jun. 1, 1993

[54] OPTICAL SYSTEM FOR SCANNING DEVICE

[75] Inventor: Robert W. Rudeen, Seattle, Wash.

[73] Assignee: Intermec Corporation, Everett, Wash.

[21] Appl. No.: 607,136

[22] Filed: Oct. 29, 1990

[51] Int. Cl.$^5$ ............................................. G02B 9/04
[52] U.S. Cl. .................................. 359/795; 359/196; 359/220; 250/568
[58] Field of Search ............... 359/220, 811, 819, 798, 359/793, 795, 820, 217, 216; 235/467, 470, 462; 250/568, 236

[56] References Cited

U.S. PATENT DOCUMENTS

| | | | |
|---|---|---|---|
| 3,817,604 | 6/1974 | Watt | 359/795 |
| 3,961,838 | 6/1976 | Zanoni | 359/795 |
| 4,916,318 | 4/1990 | Iima | 250/568 |
| 4,919,502 | 4/1990 | Yamakawa | 359/217 |
| 4,930,850 | 6/1990 | Morimoto | 359/217 |

Primary Examiner—Loha Ben
Attorney, Agent, or Firm—Seed & Berry

[57] ABSTRACT

A temperature-compensated optical system for a scanning device. The optical system includes a first optical element having a positive radius of curvature in a plane and a second optical element having a negative radius of curvature in the plane. Both optical elements focus light energy to nearly the same point within a housing of the scanning device. The focal point is on the side of the second optical element that is opposite to the first optical element. In one embodiment, the optical system can be two separate optical elements and, in another embodiment, the optical system can be an integral piece of material, such as plastic, with the first and second optical elements being surfaces on opposite sides of the integral piece.

9 Claims, 4 Drawing Sheets

OPTICAL SYSTEM FOR SCANNING DEVICE

DESCRIPTION

1. Technical Field

This invention relates to an optical system and, more particularly, to an optical system for use with a bar code scanning reader.

2. Background Art

A bar code reader typically uses a beam of light to read a bar code, which consists of alternating strips ("bars") of differing reflectivities. The scanner then receives and interprets the fluctuations in the returning light that are caused by the bar code.

It is known in the prior art to read bar codes by means of a scanning reader which does not require physical contact with the bar code which is to be read. A scanning reader typically produces a beam of light which is repetitively scanned across an area that contains a bar code. If the beam of light intercepts a bar code (or some other symbology), the modulated light which is reflected by the bar code is returned to sensing circuitry in the scanning reader for interpretation.

The beam of light is produced by a series of optical elements that receive light from a light source. The light source in a modern bar code scanner is generally a very low power solid state laser device, since such devices are efficient and light, and they can be made reliably and relatively inexpensively. The beam of light from the light source is shaped by the series of optical elements. The light beam-shaping typically includes focussing the beam of light and causing it to have an elliptical shape.

Heretofore, light beams in bar code scanners have been focussed by a configuration of two convex optical elements, known as a Newtonian telescope. In this configuration, the two optical elements, both having radii of curvatures which are positive, focus the light to a point between them. This produces a chain of optical elements that is longer than it needs to be. Further, temperature increases, which cause the radii of curvatures of both optical elements to increase, also cause their focal points to both move away from their previously common focal point, degrading the quality of the beam of light. while the temperature sensitivity of the optical elements can be reduced by making them from glass materials having low thermal coefficients of expansion, such glasses are expensive.

DISCLOSURE OF THE INVENTION

It is an object of the present invention to provide a compact optical configuration for a bar code scanner.

It is another object of the present invention to provide an optical configuration for a bar code scanner that has low sensitivity to temperature variations.

It is a further object of the present invention to provide an inexpensive optical configuration for a bar code scanner.

These and other objects can be provided by an apparatus for transmitting a scanning beam of optical energy along an optical path to a bar code within a predetermined range of distances. The apparatus comprises two optical elements. The first optical element includes a surface that has a positive curvature in a focussing plate perpendicular to the plane defined by the scan of the beam for receiving and transmitting the beam of optical energy therethrough and the second optical element includes a surface that has a negative curvature in the same plane for focussing for receiving the beam of optical energy transmitted by the first optical element and transmitting the beam of optical energy therethrough to the bar code, the first and second optical elements being made from substantially the same material. The optical elements do not have any power in the plane parallel to the plane defined by the scan of the beam.

In a particular embodiment the invention provides an apparatus for transmitting a beam of optical energy along an optical path to a bar code within a predetermined range of distances. The apparatus comprises two optical elements. The first optical element includes a surface that has a positive curvature in a focussing plane for receiving and transmitting the beam of optical energy therethrough to a focal point on the optical path; the second optical element includes a surface that has a negative curvature in the same plane for receiving the beam of optical energy transmitted by the first optical element and transmitting the beam of optical energy therethrough to the bar code. The second optical element has nearly the same focal point as the first optical element. The focal point is located on the side of the second optical element that is opposite to the side on which the first optical element is located.

BEST MODE FOR CARRYING OUT THE INVENTION

Figure 1:
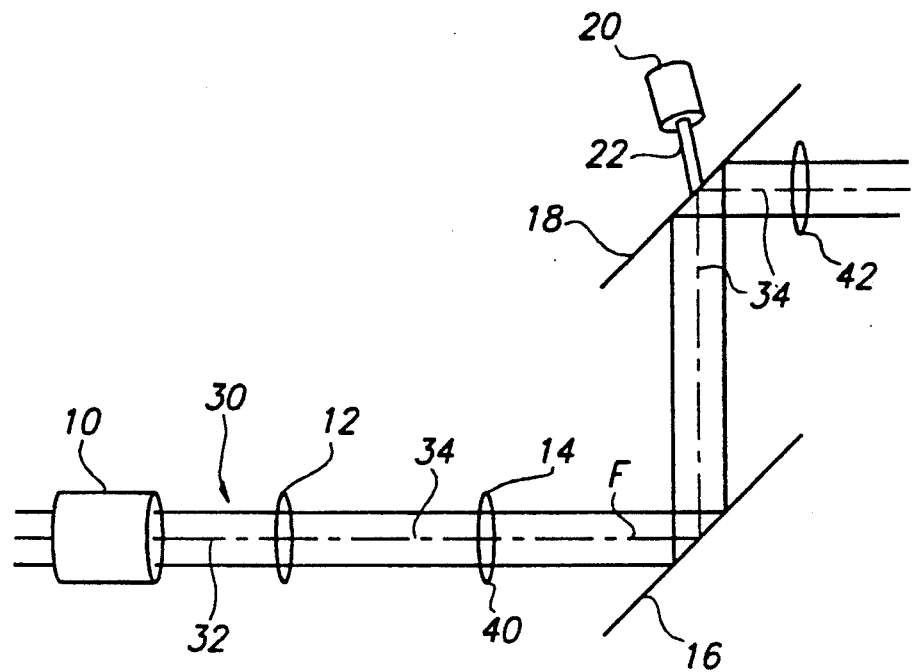
FIG. 1 is a schematic diagram of the optical configuration of a scanning laser bar code reader known in the prior art.

FIG. 1 is a schematic diagram of the optical configuration of a scanning laser bar code reader known in the prior art. The optical configuration includes a light source 10, collimating optical element 12, beam-shaping optical element 14, folding mirror 16 and scanning mirror 18. The scanning mirror 18 can be driven in a reciprocating, or rotary, motion by a motor 20 through the shaft 22 which is attached to the scanning mirror 18. If desired, the optical path between the optical element and the scanning mirror can be made straight by eliminating the folding mirror and folding the path from the optical element by ninety degrees.

The light source 10, which can be a laser diode, produces light in a pattern 30 that is generally fanned-out with respect to an optical axis 32 that defines the beginning of an optical path 34 through the bar code reader. The optical path passes through the collimating optical element 12, beam-shaping optical element 14, folding mirror 16 and scanning mirror 18.

If the light source 10 is a laser diode, the pattern 30 is contained within a fan angle of approximately seven degrees in one plane and a fan angle of approximately thirty-five degrees in a perpendicular plane. For the purpose of reading bar codes, it is highly desirable for the light beam produced by a bar code scanner to be very narrow in the scanning direction. Accordingly, the optical configuration in the bar code scanner is designed to image the narrow dimension of the light beam produced by the light source 10 in the scanning direction and make the wide dimension of the light beam appear perpendicular to the scanning direction. Henceforth in this application the scanning direction will be said to occur in the horizontal plane and the perpendicular plane will be termed the vertical plane, since these represent the orientation in which a bar code scanner is generally used.

A first step in the process of producing an appropriate light beam for scanning bar codes is to focus the fanned-out pattern 30 produced by the light source 10. The optical element 12 is generally an aspheric lens and nearly collimates the light in both horizontal and vertical planes. After the lens the light beam is generally wider than desired in at least one plane.

Next, the optical configuration of the bar code scanners known in the prior art causes the light beam to be reduced. This occurs in the horizontal plane. The beam-shaping optical element 14 allows the size reduction to be accomplished independently in the horizontal and vertical planes.

The beam-shaping optical element 14 comprises a first asymmetric optical element 40 and a second asymmetric optical element 42. The first and second optical elements both have positive powers. Accordingly, they both have a focal point located near point F, which occurs therebetween on the optical path 34. The first asymmetric optical element 40 focus the vertical axis of the light beam to a waist at point F (the horizontal axis is not affected by element 40). The second asymmetric optical element 42 acts on the vertical axis only and refocuses the vertical axis of the light beam. The light beam produced by the second asymmetric optical element has the appropriate ellipticity for scanning bar code symbols. To provide compactness desired in bar code scanners, the optical path may be bent by means of a fixed folding mirror 16 and the scanning mirror 18. Frequently this is accomplished by placing the scanning mirror between the first and second optical elements of the beam-shaping optical element.

Temperature changes affect the powers of both the first and second asymmetric optical elements 40 and 42 in the vertical axis. Since both optical elements are made from materials having positive thermal coefficients of expansion, the powers of both optical elements will increase. This causes the focal points of the two optical elements to move away from the respective optical elements, so that they move apart on the optical path 34. This produces an out-of-focus image which deteriorates the performance of the scanning bar code reader.

Figure 2:
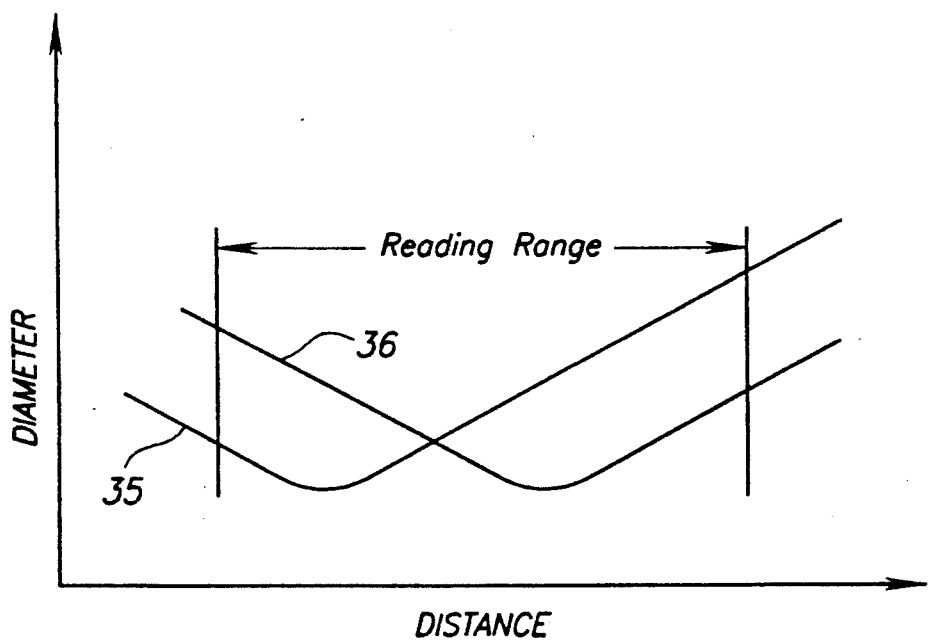
FIG. 2 is a plot of the diameters of the horizontal and vertical dimensions of a scanning laser bar code reader known in the prior art, as a function of distance along an optical axis.

FIG. 2 is a plot of the diameters of the horizontal and vertical dimensions of a scanning laser bar code reader known in the prior art, as a function of distance along an optical axis. The curves 35 and 36 for the horizontal and vertical beam diameters, respectively, show that the vertical axis of the light beam is focussed beyond the horizontal axis. They also show that the height-to-width ratio of the light beam is highly variable in the reading range known in the prior art.

Figure 3:
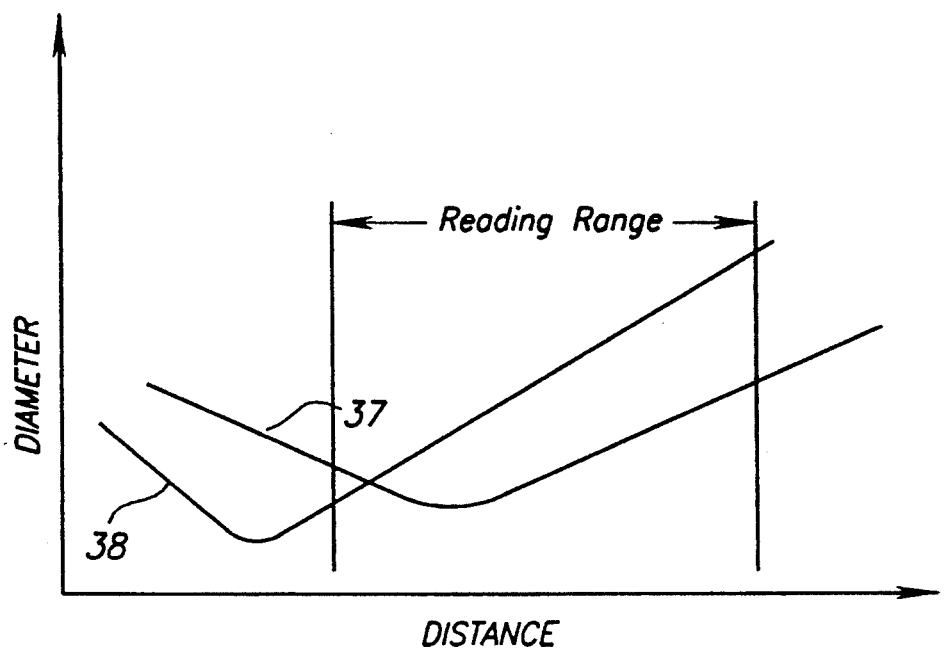
FIG. 3 is a plot of the diameters of the horizontal and vertical dimensions of a scanning laser bar code reader according to the present invention, as a function of distance along an optical axis.

FIG. 3 is a plot of the diameters of the horizontal and vertical dimension of a scanning laser bar code reader according to the present invention, as a function of distance along an optical axis. The curves 37 and 38 for the horizontal and vertical beam diameters, respectively, show that the vertical axis of the light beam is focussed before the horizontal axis. They also show that the height-to-width ratio of the light beam that is produced according to the present invention is substantially greater than 1 throughout the reading range.

Figure 4A:
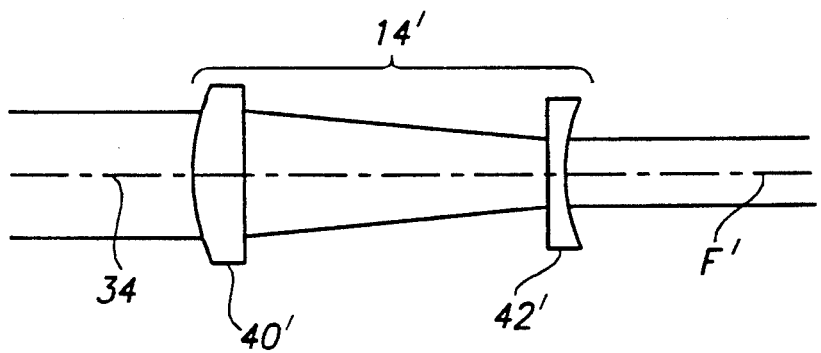
FIG. 4A is a schematic cross-sectional diagram of the general optical configuration of the invention, the cross-section being taken in a first plane.
Figure 4B:
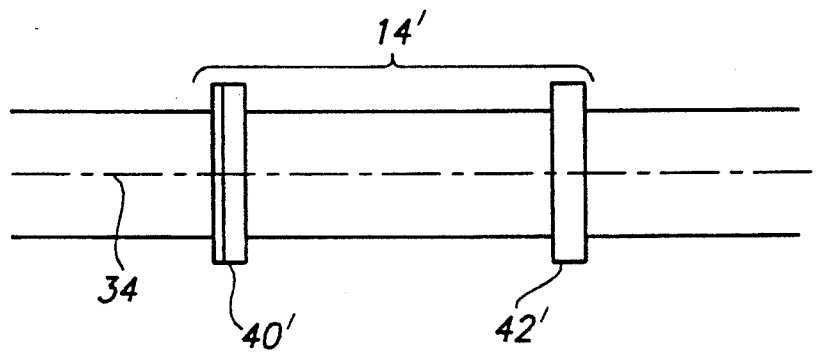
FIG. 4B is a schematic cross-sectional diagram of the general optical configuration of the invention, the cross-section being taken in a second plane that differs from the first plane of FIG. 4A.

FIG. 4A is a schematic cross-sectional diagram of the general optical configuration of the invention, the cross-section being taken in a first plane taken perpendicular to the scanning plane and FIG. 4B is a schematic cross-sectional diagram of the general optical configuration of the invention, the cross-section being taken in a second plane parallel to the scanning plane. The light beam produced by the light source 10 passes from left to right in FIGS. 4A and 4B. FIGS. 4A and 4B show a beam-shaping optical element 14' comprising a first optical element 40' and a second optical element 42'. The beam-shaping optical element is placed along the optical path 34, it being understood that a folding mirror, such as folding mirror 16, could be placed between the first and second optical elements. The first optical element 40' has a surface 41' that has a positive power in the vertical plane, so that it focuses the light beam toward a focal point F' on the optical path. The focal point F' is beyond the second optical element. The second optical element has a virtual focal point just beyond point F', due to the negative power of the surface 43' in the vertical plane. The first and second optical elements have no power in the horizontal plane (see FIG. 4B), so that they do not change the horizontal dimension of the light beam that passes through them.

When temperature changes affect the curvature of the first and second optical elements 40' and 42', the changes in their focal points compensate for one another. For example, when both of the optical elements are made from a material having a positive coefficient of thermal expansion, the positive radius of curvature of the first optical element causes its focal point to move to the right, away from the first optical element. Similarly, under the same conditions, the focal point of the second optical element also moves away from the second optical element. Accordingly, the focal points of the first and second optical elements move in the same direction, causing the beam-forming optical element 14' to maintain a high degree of focus over a large range of temperatures.

One benefit of the compensating effect of the thermal response of the first and second optical elements 40' and 42' is that the same performance that was accomplished in the prior art can now be accomplished by other, generally less-expensive, materials having larger coefficients of thermal expansion. For example, whereas acceptable performance from the beam-forming optical element 14 of the prior art required that the first and second optical elements 40 and 42 be made from glass, in the present invention, the same performance can be accomplished if the first and second optical elements 40' and 42' are formed from an inexpensive plastic. In addition, the overall length of the beam-forming optical element 14' can be less than that of its counterpart, optical element 14, known in the prior art.

Figure 5:
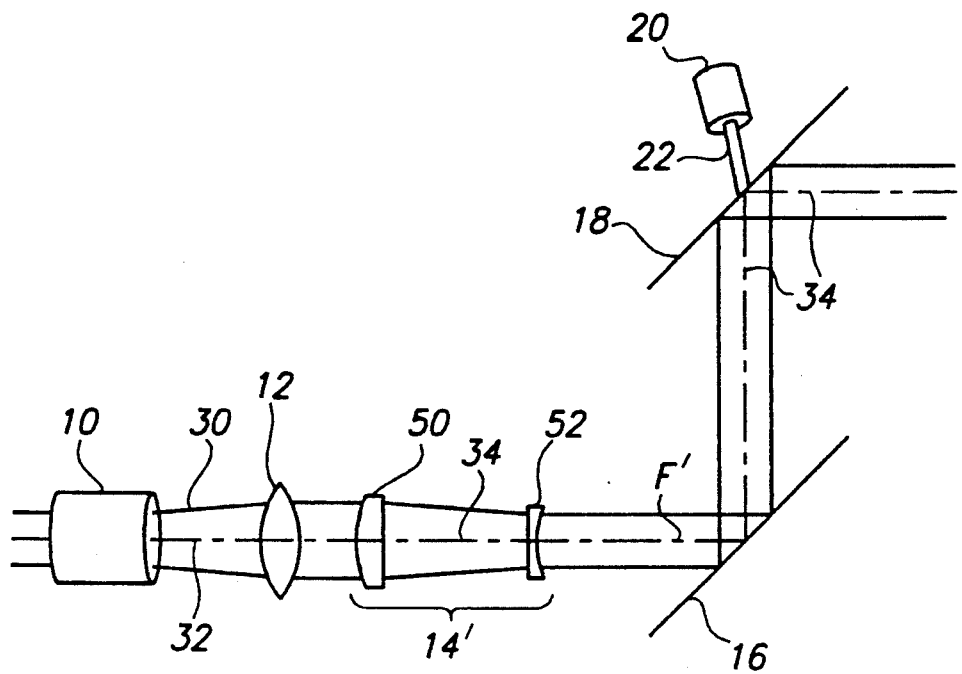
FIG. 5 is a schematic cross-sectional diagram of a portion of a first embodiment of the optical configuration of the invention, the cross-section being taken in the first plane.

FIG. 5 is a schematic cross-sectional diagram of a portion of a first embodiment of the optical configuration of the invention, the cross-section being taken in the first plane. Where appropriate, reference numbers of features of the various embodiments of the invention which are unchanged are the same as the reference numbers used in FIG. 1. Focal point F is also defined as in the description of the optical configurations shown in FIG. 1. The optical configuration includes a light source 10, collimating optical element 12, beam-shaping optical element 14', folding mirror 16 and scanning mirror 18. The scanning mirror 18 can be driven in a reciprocating, or rotary, motion by a motor 20 through the shaft 22 which is attached to the scanning mirror 18. In this first embodiment, the first and second optical elements 50 and 52, respectively, of the beam-shaping optical element 14' are located ahead of the folding mirror 16, all other elements being unchanged from those shown in FIG. 1.

Figure 6:
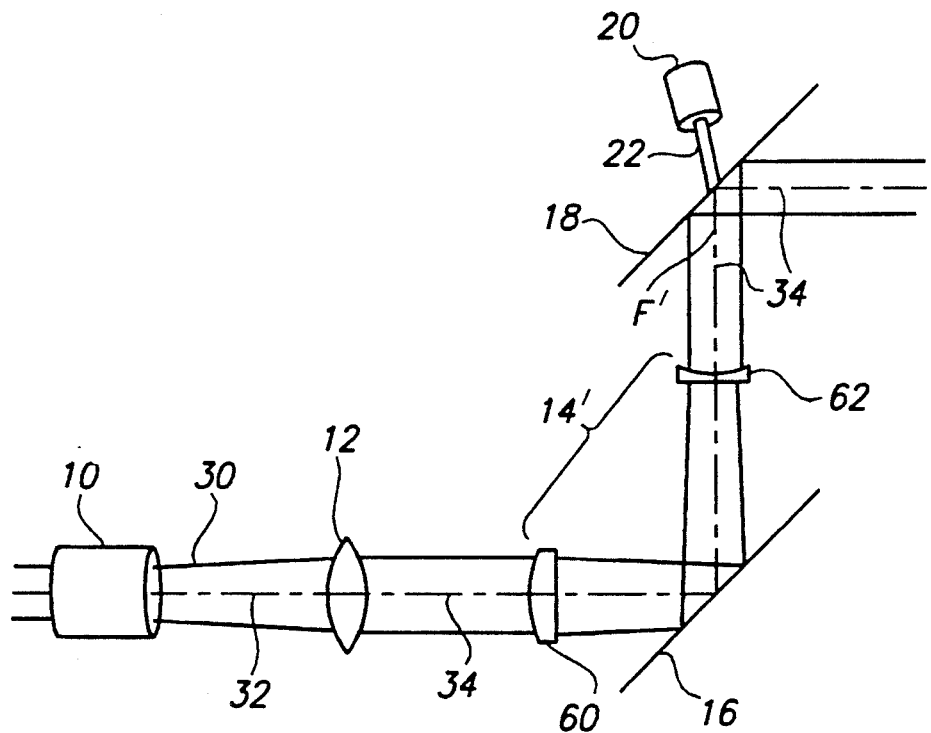
FIG. 6 is a schematic cross-sectional diagram of a portion of a second embodiment of the optical configuration of the invention the cross-section being taken in the first plane.

FIG. 6 is a schematic cross-sectional diagram of a portion of a second embodiment of the optical configuration of the invention, the cross-section being taken in the first plane. In this second embodiment, the folding mirror 16 is located between the first and second optical elements 60 and 62 of the beam-shaping optical element 14', all other elements being unchanged including the designation of the focal point, F.

Figure 7:
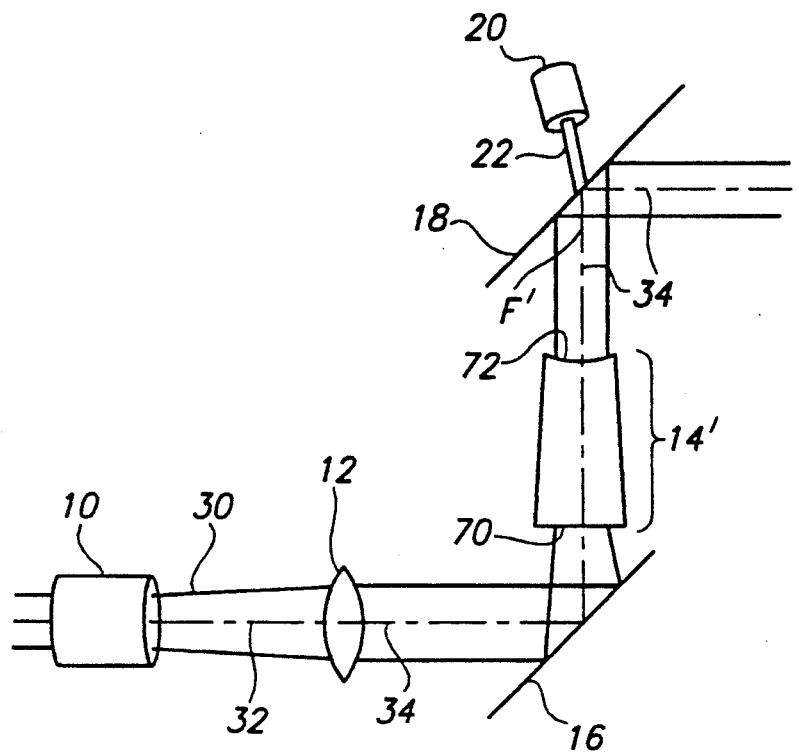
FIG. 7 is a schematic cross-sectional diagram of a portion of a third embodiment of the optical configuration of the invention, the cross-section being taken in the first plane.

FIG. 7 is a schematic cross-sectional diagram of a portion of a third embodiment of the optical configuration of the invention, the cross-section being taken in the plane perpendicular to the scanning plane. In this third embodiment, the beam-shaping optical element 14' is an integral structure, made from a single piece of material, for example, a clear plastic. The beam-shaping optical element is located following the folding mirror 16. The first optical element of the beam-shaping optical element 14' is the surface 70, which has a positive radius of curvature and therefore a positive curvature and the second optical element is the surface 72, which has a negative radius of curvature and therefore a negative curvature. Both the first and second optical elements 70 and 72 focus near focal point F'.

Figure 8:
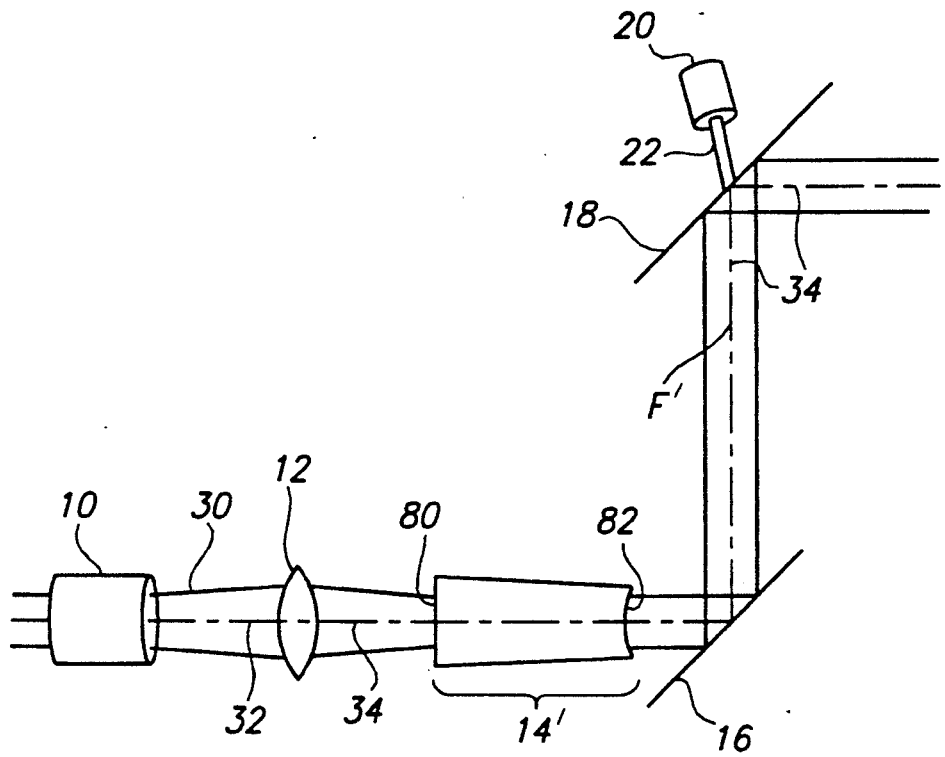
FIG. 8 is a schematic cross-sectional diagram of a portion of a fourth embodiment of the optical configuration of the invention, the cross-section being taken in the first plane.

FIG. 8 is a schematic cross-sectional diagram of a portion of a fourth embodiment of the optical configuration of the invention, the cross-section being taken in the first plane. In this fourth embodiment, the beam-shaping optical element 14' is also an integral structure, made from a single piece of material, for example, a clear plastic. The beam-shaping optical element is located ahead of the folding mirror 16. The first optical element of the beam-shaping optical element 14' is the surface 80, which has a positive radius of curvature and therefore a positive curvature and the second optical element is the surface 82, which has a negative radius of curvature and therefore a negative curvature. Both the first and second optical elements 80 and 82 focus near focal point F'.

While the detailed description above has been expressed in terms of specific examples, those skilled in the art will appreciate that many other configurations could be used to accomplish the purpose of the disclosed inventive apparatus. Accordingly, it can be appreciated that various modifications of the above-described embodiments may be made without departing from the spirit and the scope of the invention. Therefore, the spirit and the scope of the present invention are to be limited only by the following claims.

I claim:

1. Apparatus for transmitting and reshaping a beam of optical energy along an optical path to a bar code comprising a plurality of parallel bars, comprising:
   a first optical element with a surface having positive power in the plane parallel to the bar code bars and including the optical path and a different power in the plane perpendicular to the bar code bars and including the optical path for receiving and transmitting the beam of optical energy therethrough; and
   a second optical element with a surface having a negative power in the plane parallel to the bar code bars and including the optical path and a different power in the plane perpendicular to the bar code bars and including the optical path for receiving the beam of optical energy transmitted by the first optical element and transmitting the beam of optical energy therethrough to the bar code, the first and second optical elements being made from substantially the same material.

2. The apparatus of claim 1 wherein the first optical element focuses the optical energy at a point along the optical path that is on the opposite side of the second optical element from the first optical element.

3. The apparatus of claim 1 wherein the first and second optical elements are formed on opposing sides of an integral piece of the material.

4. Apparatus for transmitting and reshaping a beam of optical energy along an optical path to a bar code comprising a plurality of parallel bars, comprising:
   a first optical element with a surface having positive power in the plane parallel to the bar code bars and including the optical path and zero power in the plane perpendicular to the bar code bars and including the optical path for receiving and transmitting the beam of optical energy therethrough; and
   a second optical element with a surface having a negative power in the plane parallel to the bar code bars and including the optical path and zero power in the plane perpendicular to the bar code bars and including the optical path for receiving the beam of optical energy transmitted by the first optical element and transmitting the beam of optical energy therethrough to the bar code, the second optical element having nearly the same focal point as the first optical element, the focal point of the second optical element being located on the side of the second optical element that is opposite to the side on which the first optical element is located.

5. Apparatus for transmitting and reshaping a beam of optical energy along an optical path to a bar code comprising a plurality of parallel bars, comprising:
   a first optical element with a surface having positive power in the plane parallel to the bar code bars and including the optical path and a different power in the plane perpendicular to the bar code bars and including the optical path for receiving and transmitting the beam of optical energy therethrough to a focal point on the optical path; and a second optical element with a surface having a negative power in the plane parallel to the bar code bars and including the optical path and a different power in the plane perpendicular to the bar code bars and including the optical path for receiving the beam of optical energy transmitted by the first optical element and transmitting the beam of optical energy therethrough to the bar code, the second optical element having nearly the same focal point as the first optical element, the focal point of the second optical element being located on the side of the second optical element that is opposite to the side on which the first optical element is located.

6. The apparatus of claim 5, wherein the first and second optical elements are made from substantially the same material.

7. The apparatus of claim 5, wherein the focal point of the second optical element is slightly beyond the focal point of the first element.

8. Apparatus for transmitting and reshaping a beam of optical energy from a light source of a bar code scanner along an optical path to a bar code comprising a plurality of parallel bars, comprising:

a first optical element with a surface having positive power in a plane parallel to the bar code bars and including the optical path and a different power in the plane perpendicular to the bar code bars and including the optical path for receiving and transmitting the beam of optical energy therethrough; and a second optical element with a surface having negative power in the plane parallel to the bar code bars and including the optical path and a different power in the plane perpendicular to the bar code bars and including the optical path for receiving the beam of optical energy transmitted by the first optical element and transmitting the beam of optical energy therethrough to the bar code, the first and second optical elements being made from substantially the same material and being adapted for fixed attachment to the light source.

9. Apparatus for transmitting and reshaping a beam of optical energy from a light source of a bar code scanner along an optical path to a bar code comprising a plurality of parallel bars, comprising:

a first optical element with a surface having a positive power int he plane parallel to the bar code bars and including the optical path and a different power in the plane perpendicular to the bar code bars and including the optical path for receiving and transmitting the beam of optical energy therethrough; and a second optical element with a surface having negative power int he plane parallel to the bar code bars and including the optical path and a different power in the plane perpendicular to the bar code bars and including the optical path for receiving the beam of optical energy transmitted by the first optical element and transmitting the beam of optical energy therethrough to the bar code, the first and second optical elements being made from substantially the same material and being adapted for fixed attachment to the light source, the first and second optical elements defining a first waist in the plane parallel to the bar code bars and including the optical path and a second waist in the plane perpendicular to the bar code bars and including the optical path, the first and second waists having different locations along the optical path, the first waist being closer to the second optical element than the second waist, whereby the beam substantially maintains a predetermined ellipticity within a desired range along the optical path.

* * * * *

UNITED STATES PATENT AND TRADEMARK OFFICE
CERTIFICATE OF CORRECTION

PATENT NO.   : 5,216,550
DATED        : June 1, 1993
INVENTOR(S)  : Robert W. Rudeen It is certified that error appears in the above-identified patent and that said Letters Patent is hereby corrected as shown below:

In column 8, claim 9, line 12, please delete "int he" and insert therefor -in the-.

In column 8, claim 9, line 19, please delete "int he" and insert therefor -in the-.

Signed and Sealed this

Eighteenth Day of January, 1994

Attest:

BRUCE LEHMAN

Attesting Officer        Commissioner of Patents and Trademarks